April 12, 1927.
A. P. BJERREGAARD
1,624,206
PROCESS OF EXTRACTING HYDROCARBONS FROM GAS
Filed Jan. 17, 1922
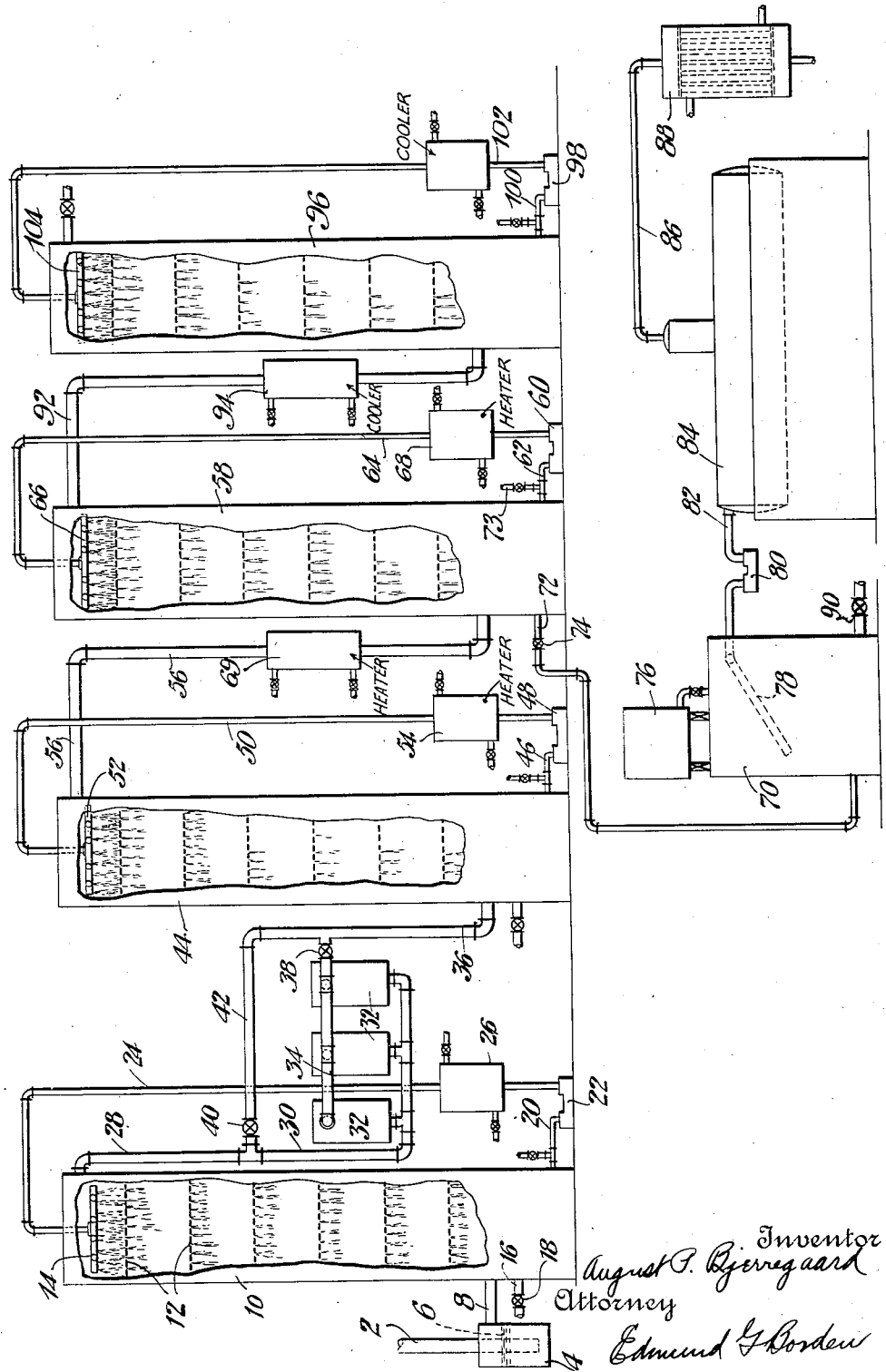

Patented Apr. 12, 1927.

1,624,206

UNITED STATES PATENT OFFICE.

AUGUST P. BJERREGAARD, OF OKMULGEE, OKLAHOMA, ASSIGNOR TO DOHERTY RESEARCH COMPANY, OF NEW YORK, N. Y., A CORPORATION OF DELAWARE.

PROCESS OF EXTRACTING HYDROCARBONS FROM GAS.

Application filed January 17, 1922. Serial No. 529,915.

This invention relates to a process of extracting hydrocarbons from gas, and more particularly to a process of extracting the aromatic hydrocarbons from coal gas.

In the process of the purification of gas as at present carried out commercially, the gas after being scrubbed to remove tar and ammonia, is passed through debenzolizing towers containing a mineral oil to remove aromatic hydrocarbons. The mineral oil such as straw-oil for example, is sprayed over a distributing material such as coke, between the lumps of which the gas passes in an upward direction. The straw oil in passing over the coke and in contact with the gas removes benzol, toluol, etc., from the gas and the gas then passes on to the purifiers in which the final step of purification takes place. The absorbent oil containing the benzol, etc., is pumped into a still in which it is heated by direct open steam, to remove the benzol, and other aromatic hydrocarbons. The oil is then cooled and is returned to the debenzolizing towers to be used over and over again in the process.

One difficulty has been encountered in the process above outlined due to the fact that in the steam distillation process the straw oil or other absorbing menstruum often forms an emulsion with water, which is present in the still due to the condensation of steam. This emulsion is not suitable for absorbing purposes and acts as an accelerator to cause other oils to be emulsified. Therefore the emulsion has been separated from the oil leaving the still and has been permitted to run into the sewer. The discarding of the emulsion is a source of considerable loss to the process.

Furthermore, an emulsion is formed frequently in the debenzolizing towers which occasions a loss of oil and also a considerable loss of time in operation. The emulsion occurring in the towers usually forms a jelly-like mass which clogs the towers and must be removed before the process can be continued.

The primary object of the present invention is to provide a process of removing hydrocarbons from gas with an absorbing oil in which the formation of emulsions of the absorbing oil is avoided.

It was formerly believed that the emulsions of oil and water with other foreign substances, which emulsions were formed in the gas purification process as above outlined, were due either to the physical property of the particular oil employed as the absorbing medium for the benzol, or else that they were due to some specific material originally present in the absorbing oil employed. The present invention is based upon the discovery that the emulsification which takes place in the process above outlined is due to a material which is introduced into the oil from the gas undergoing purification. It has been found that the particular agent which causes emulsification is a material which is soluble in caustic soda solution, and may be removed either by the use of this alkali or by the use of an absorbing menstruum such as straw oil when maintained at a temperature sufficiently high to prevent the condensation of water in the oil and to prevent the absorption of the benzol and the other aromatic hydrocarbons which it is desired to recover in a later step of the process. It has been found by analysis that the emulsifying agent above referred to consists mainly of various phenols together with some tarry and carbonaceous matter which are in the gas.

Accordingly, another object of the invention is to provide a process of removing hydrocarbons from gas with an absorbing oil by which the oil is maintained in such a condition that emulsions will not be formed in the still in which the hydrocarbons are removed from the oil.

With these and other objects in view, the invention consists in the improved process of extracting hydrocarbons from gas hereinafter described and particularly pointed out in the claims.

The manner in which the process of my invention may be carried out is described in connection with the accompanying drawing, in which the view shows an apparatus for carrying out the preferred form of the invention, the parts being shown in elevation and partly in section.

Referring to the drawings, the process is carried out in the following manner:

Coke oven gas or other gas to be purified is passed from the retorts or coke ovens (not shown in the drawing) through the dip pipe 2 into a hydraulic main 4 containing water 6, which serves to wash out a part of the tarry matters and ammonia compounds present in the gas, and also to partly cool the same. The gas after this preliminary washing is passed through a pipe 8 into a water scrubbing tower 10. This scrubber has perforated plates 12 through which the gas passes in an upward direction, while water is admitted through a spray pipe 14 at the top of the tower and passes downwardly through the gas and plates. The water is admitted through a spray pipe 14 at the top of the tower and passes downwardly through the gas and plates. The water is broken up by perforated plates and comes into intimate contact with the gas passing upwardly through the tower and removes most of the tarry material from the gas. After passing through the scrubber the wash water accumulates in a chamber at the bottom of the tower and is circulated by a pump 22 through pipes 20 and 24 into the spray pipe 14 at the top of the tower to be used over and over. The tar and other impurities together with a portion of the water in the chamber at the bottom of the tower may be continuously or intermittently drawn off through a pipe 16 and valve 18. The pipe 24 passes through a cooler 26 by which the scrubbing water may be held at any desired temperature. The gas after being washed in the scrubber 10 passes out through pipe 28 at the top of the scrubber, and preferably is conducted through a pipe 30 to tar separators 32 and out through pipe 36 into the bottom of an ammonia scrubber 44. If the tar is sufficiently removed in the scrubber 10 the tar separators may be by-passed by opening valve 40 in a pipe 42 and closing valve 38 in the pipe 34, whereby the gas is made to pass directly from the pipe 28 through pipe 42, to the pipe 36. Any form of filter or tar separator may be used for filtering the gas at 32, but preferably the commercial "P and A" tar separator is employed for this purpose.

The ammonia scrubber 44 is similar in construction to scrubber 10 previously described, but in the place of a water spray a spray of dilute sulphuric acid is employed. The sulphuric acid employed is preferably hot and is used for the purpose of removing ammonia and pyridine from the gas. The sulphuric acid after passing through the tower accumulates in a chamber at its bottom and is pumped by the pump 48 through pipes 46 and 50 up to a spray pipe 52, located in the top of the tower. The pipe 50 passes through a heater 54 which is used to heat the sulphuric acid to the desired temperature. This heater may be of any desired form, such, for instance, as a steam heater or the ordinary gas burner.

The gas after passing through the scrubber 44 passes through pipe 56 which leads from the top of this scrubber to the lower portion of a tower 58 which is similar in construction to scrubbers 10 and 44, except that this tower is necessarily lagged to reduce the loss of heat to a minimum. In the tower 58 the emulsifying materials present in the gas are removed by a suitable agent. One of the agents which has been found suitable for this purpose is a mineral oil called straw-oil. In order that the benzol and toluol be not removed at the same time, the temperature of the oil must be maintained above a certain minimum. It has been found that temperatures slightly above the boiling point of the benzol (191° F.) are satisfactory in ordinary operation, but lower or higher temperatures may be employed if desired. It has been found that at the above named temperature the amounts of benzol and toluene absorbed by the straw-oil are negligible, while the phenol compounds and tarry matters are satisfactorily removed. In order to maintain the temperature of the straw-oil at the point where it first comes into contact with the gas from the scrubber 44 at the proper degree, it is necessary to heat the oil considerably above the desired temperature, for the reason that the oil becomes gradually cooled in its passage through the scrubber. The absorbing oil used in the absorber 58 accumulates in a chamber at the bottom of the absorber and is circulated from here by means of the pump 60 through pipes 62 and 64 into a spray pipe 66 located at the top of the tower. The pipe 64 passes through a heater 68 by which the oil may be maintained at any desired temperature. If the gas carries a large amount of water so that it is difficult to maintain the desired temperature in tower 58 to prevent condensation a heater 69 through which the pipe 56 passes may be used for heating the gas before it enters the tower.

After the oil has absorbed such an amount of phenols and other emulsifying agents that it no longer removes all of the emulsifying agents from the gas, it is then run into a treating tank 70 through a pipe 72, having a valve 74. If desired, instead of the batch treatment as above outlined, a portion of the oil passing to the bottom of the tower may be continuously run into the tank 70 through the pipe 72, and the fresh oil may be continuously added to the oil being circulated by the pump 60 through a pipe 73 so as to maintain constant conditions in the apparatus.

The mineral absorption oil from the hot tower 58 may be utilized in one of various ways, as for instance, it can be used as fuel oil or in gas making for enriching water gas, or can be cleaned so as to be again used in the absorbing tower. To clean the oil the phenols are removed by washing the oil with sodium hydroxide solution, and tars and other impurities are separated from the oil by distillation. In removing the phenols from the oil a sodium hydroxide solution from a tank 76 positioned upon the tank 70 is run into the absorption oil in the tank. The oil and sodium hydroxide are thoroughly mixed and allowed to settle, at which time the upper layer will contain the oil and the lower layer will contain the sodium hydroxide, sodium phenolate and some tarry matter. The cleaned oil is removed from the tank 70 through a swing pipe 78 and forced by means of a pump 80 through a pipe 82 into a still 84. The absorption oil is removed from the still by heat distillation, the oil vapors passing through a line 86 to a condenser 88 where it may be recovered in condition to be again returned to the hot absorbing tower 58. The sludge layer separated at the bottom of the tank 70 is withdrawn through a valved pipe 90 to recover the phenols therefrom, by any of the usual commercial methods.

The gas after being passed through the tower 58 and being stripped of its tarry matter, phenols and other emulsifying agents, then passes through a pipe 92 and cooler 94 into the bottom of an absorber 96, in which the benzol and other valuable aromatic hydrocarbons may be removed. Any suitable absorbing oil such as the straw oil employed in the tower 58 is circulated by means of a pump 98 either from an outside source or through a pipe 100 from the bottom of the absorbing tower through a pipe 102 to a spray pipe 104 at the top of the chamber.

Various modifications of my process may be made without departing from the spirit of the invention, although the process as above outlined is at the present time the most satisfactory and economical.

In place of a mineral oil or absorbing menstruum for removing the emulsifying agents in the gas, the dilute solution of caustic soda may be used to advantage. It has also been found that the Cottrell method of electric precipitation will remove tarry matter and other emulsifying agents from the gas, but it has been found that this system is not economical in operation as compared with the procedure set forth above.

Other means of separating the specific emulsion forming materials from the gas to be purified might be employed and are considered within the scope of my invention; such, for instance, as separating the emulsifying agent by filtering or centrifuging to remove the undesired materials before the absorption step for the recovery of benzol and other aromatic hydrocarbons. In the claims the term "physical means" has been employed to include such mechanical means as well as the absorption means as set forth in detail above.

The preferred form of the invention having been thus described what is claimed as new is:

1. In the art of gas purification a process comprising, first, treating the gas with water; second, treating the gas with dilute sulphuric acid; third, treating the gas with a hot mineral oil absorbent to remove emulsifying agents; and fourth, absorbing benzol and other desired aromatic hydrocarbons present in the gas in a mineral oil, substantially as described.

2. In the art of gas purification a process which comprises, first, washing and cooling the gas; second, removing ammonia and pyridine from the gas; third, continuously removing emulsifying agents from the gas; and fourth, removing the aromatic hydrocarbons present in the gas.

3. In the art of gas purification a process comprising the continuous removal of the emulsifying agents from the gas prior to the step of removing benzol and other aromatic hydrocarbons.

4. In the art of gas purification, a process of preventing the formation of emulsions with an absorbing menstruum, comprising the continuous removal of the emulsifying agents from the gas, and subsequently passing the gas into contact with an absorbing menstruum to remove the benzol.

5. The process of preventing the formation of emulsions of mineral oil and water in gas manufacture comprising continuously removing the active emulsion forming constituents from the gas by absorption and thereafter passing the gas into contact with mineral oil to remove benzol and other aromatic hydrocarbons from the gas.

6. In the manufacture of coke oven gas the process of preventing the formation of emulsions of mineral oil absorbing menstruum, comprising continuously absorbing the emulsifying agents present in the gas in a liquid menstruum before bringing the gas into contact with the mineral oil absorbing menstruum for removing the benzol and other desired aromatic hydrocarbons.

7. The process of preventing the formation of emulsions of mineral oil absorbing menstruums comprising continuously absorbing the emulsifying agents present in the gas in a liquid menstruum maintained at a temperature above which water vapor in the gas will condense, and thereafter absorbing benzol and other aromatic hydrocarbons in the gas by means of a liquid menstruum maintained at a temperature below that of the first menstruum.

8. In the art of gas manufacture the process which comprises passing the gas through a liquid absorbing menstruum maintained at such a temperature that it will remove emulsifying agents in the gas while permitting aromatic hydrocarbons to pass therethrough unabsorbed, treating the menstruum to remove the emulsifying agent and returning the clean menstruum to treat more gas.

9. In the art of gas manufacture the process which comprises passing the gas through a straw oil maintained at such a temperature as to remove emulsifying agents while permitting aromatic hydrocarbons to pass therethrough unabsorbed, treating the straw oil resulting therefrom with an agent which chemically reacts with the emulsifying agent to remove the same, and returning the purified oil for treating more gas.

10. In the art of gas manufacture, the process which comprises absorbing phenols and other impurities in the gas in a hot oil absorbing menstruum, treating the menstruum to recover phenol absorbed therein and distilling the menstruum to recover clean oil.

11. In the art of gas manufacture, the process which comprises absorbing phenols and tars in the gas in a mineral oil menstruum, treating the menstruum with sodium hydroxide to recover the phenols and purifying the menstruum for reuse in the process.

12. In the art of gas manufacture, the process which comprises continuously absorbing the phenols and other impurities in the gas in a liquid menstruum maintained at a temperature above that at which the aromatic hydrocarbons will be absorbed therein, thereafter absorbing the aromatic hydrocarbons in a similar liquid menstruum maintained at a lower temperature suitable for absorption.

13. A process of preventing the formation of emulsions of mineral oil absorbing menstruums comprising scrubbing the gas with mineral oil maintained at a temperature above which water will condense therein, and above which aromatic hydrocarbons will be absorbed therein, thereafter scrubbing the gas with a mineral oil at a lower temperature to remove the aromatic hydrocarbons, treating the hot oil absorbing menstruum with sodium hydroxide to remove phenols, distilling the treated menstruum to recover a purified menstruum, and returning the purified menstruum to the process.

14. In the art of gas manufacture, the process which comprises continuously absorbing emulsifying agents present in the gas treated in a liquid menstruum, then further treating the gas with a liquid menstruum for removing aromatic hydrocarbons.

15. In the art of gas manufacture, the process which comprises passing the gas through a mineral oil maintained at such a temperature as to remove emulsifying agents while permitting aromatic hydrocarbons to pass therethrough unabsorbed, removing the emulsifying agents from said mineral oil, returning said purified mineral oil for removing additional emulsifying agents from the gas, and absorbing benzol from the gas in mineral oil maintained at a lower temperature than that used to absorb emulsifying agents.

16. In the art of gas manufacture, the process which comprises passing the gas through a liquid absorbing menstruum maintained at such a temperature that it will remove emulsifying agents in the gas while permitting benzol hydrocarbons to pass therethrough unabsorbed, treating said menstruum to remove the emulsifying agents and returning clean menstruum to treat more gas, and removing benzol from the gas after its treatment by said menstruum by absorbing the benzol in mineral oil.

17. In the art of gas manufacture, a process comprising scrubbing the gas with mineral oil maintained at a temperature above which water will condense therein and above which aromatic hydrocarbons will be absorbed therein, thereafter scrubbing the gas with a mineral oil at a lower temperature to remove the aromatic hydrocarbons, treating the hotter mineral oil to remove phenols, distilling said treated oil to purify it, and returning the purified oil to the process.

18. In the art of gas manufacture, the process which comprises passing the gas through a liquid absorbing menstruum maintained at such a temperature that it will remove emulsifying agents in the gas while permitting benzol hydrocarbons to pass through unabsorbed, treating said menstruum to remove the emulsifying agents and returning clean menstruum to treat more of the gas, and removing benzol from the gas after its treatment by said menstruum by absorbing the benzol in a second liquid.

19. In the art of gas manufacture, the process which comprises passing the gas through a liquid absorbing menstruum maintained at such a temperature that it will remove phenol in the gas while permitting benzol to pass therethrough unabsorbed, treating said menstruum to remove the phenol and returning clean menstruum to treat more gas, and removing benzol from the gas after its treatment by said menstruum by absorbing the benzol in mineral oil.

20. In the art of gas manufacture, the process which comprises absorbing phenols and other impurities in the gas in a hot mineral oil, treating said oil to recover phenols absorbed therein, and purifying the oil for reuse in the process.

21. In the art of gas manufacture, the process which comprises absorbing phenols and tars in the gas in a mineral oil, treating said oil to recover phenols, and purifying the oil.

22. In the art of gas manufacture, the steps comprising absorbing phenols in the gas in a liquid medium, and treating said medium to recover phenols therefrom.

In testimony whereof I affix my signature.

AUGUST P. BJERREGAARD.